United States Patent Office 3,495,893
Patented Feb. 17, 1970

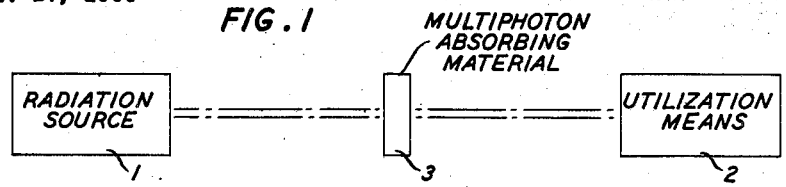
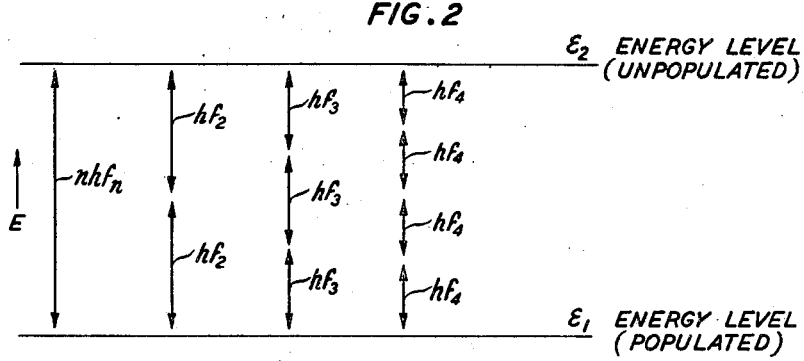
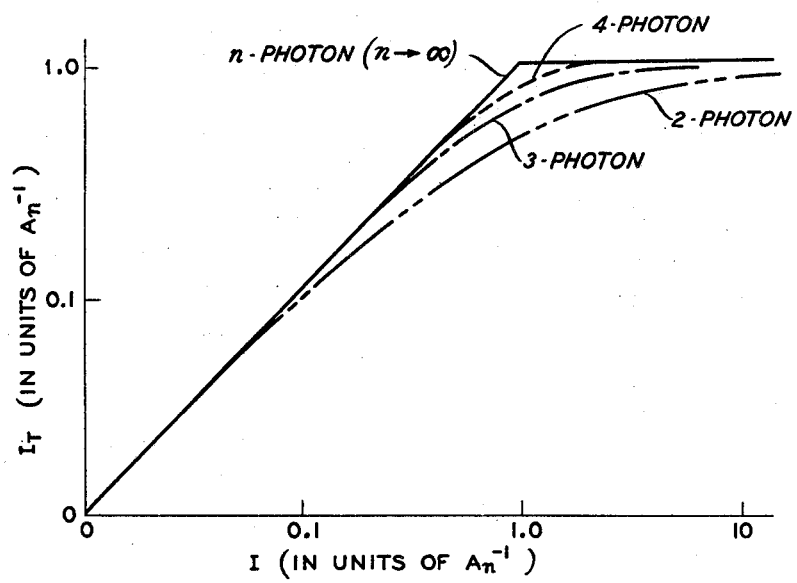

3,495,893
OPTICAL LIMITER UTILIZING MULTIPHOTON ABSORBING MATERIAL
Joseph E. Geusic, Berkeley Heights, and Shobha Singh, Summit, N.J., assignors to Bell Telephone Laboratories, Incorporated, Murray Hill, N.J., a corporation of New York
Filed Oct. 17, 1966, Ser. No. 587,330
Int. Cl. G02f 1/28, 1/36; C09k 1/04
U.S. Cl. 350—160
4 Claims

ABSTRACT OF THE DISCLOSURE

A radiation power limiter useful in the optical region is made from a multiphoton absorbing material. In particular, it has been discovered that the higher the order of the multiphoton absorption process (i.e., the greater the number of photons simultaneously absorbed to effect a single transition), the more nearly the transmission characteristics of the absorber approach those of an ideal limiter for radiation of the appropriate frequency.

---

This invention relates to radiation limiting devices and, more specifically, to a passive limiter utilizing the nonlinear transmission characteristics of a multiphoton absorbing material.

The recent invention of the optical maser and the increasing need for communications systems with high information carrying capacities have led to greatly increased efforts to develop an optical communications system. (See S. E. Miller, Communications by Laser, Scientific American 214:19 January 1966.)

One important element in an optical communications system, based upon either amplitude or pulse code modulation, is a device which can be used to limit the radiation power level. Such devices, called limiters, are useful, for example, as means for providing carrier waves and pulses of uniform amplitudes.

An ideal power limiter is one in which the power transmitted, $P_t$, is equal to the incident power, $P_o$, for levels of incident power less than some saturation level, $P_c$, and equal to $P_c$ for values of $P_o$ greater than $P_c$.

Present limiters which have been designed primarily for radio or microwave frequencies are not suited for use at optical frequencies.

Accordingly, the broad object of the present invention is to provide a radiation power limiting device which operates in the optical region.

The present invention makes use of the phenomenon of multiphoton absorption by which a number of photons are simultaneously absorbed in a single transition between two quantum energy levels. In the ordinary process of radiation absorption, a material having a populated quantum energy level $E_1$ and an unfilled higher level $E_2$ absorbs photons of radiation having a frequency $f$ which is related to the energy levels by the formula, $$f = \frac{E_2 - E_1}{h} \tag{1}$$

where $h$ is Planck's constant. In addition to ordinary absorption, higher order, or multiphoton absorption, has also been observed whereby an ion at the $E_1$ level is raised to a higher level, $E_2$, by the simultaneous absorption of two or three photons of frequency $$\frac{E_2 - E_1}{2h} \text{ or } \frac{E_2 - E_1}{3h}$$

respectively. For observations of multiphoton absorption, see Singh and Bradley, Three-Photon Absorption in Naphthalene Crystals by Laser Excitation, Physical Review Letters 12:612 (1964) and Singh and Stoicheff, Double-Photon Excitation of Fluorescence in Anthracene Single Crystals, Journal of Chemical Physics 38:2032 (1963) and references cited therein. For a treatment of the theory of double-photon absorption, see J. D. Axe, Jr., Two-Photon Processes in Complex Atoms, Physical Review 136A, 42 (1964).

The present invention makes use of the property that the transmission characteristic through multiphoton absorbing materials is nonlinear. In particular, it has been discovered that the higher the order of the multiphoton absorption process (i.e., the greater the number of photons simultaneously absorbed to effect a single transition), the more nearly the transmission characteristics of the absorber approach those of an ideal limiter for radiation of the appropriate frequency.

In the embodiments of the present invention to be described in greater detail hereinbelow, an element of a material which absorbs radiation by a multiphoton process—preferably a higher order multiphoton process—is used as a radiation power intensity limiter.

The invention may now be described in greater detail by reference to the accompanying drawings wherein:

FIG. 1 is a block diagram of a typical power intensity limiter in accordance with the invention;

FIG. 2 is an energy level diagram illustrating simple multiphoton absorption processes;

FIG. 4 is a graphical representation of predicted transmission characteristics for typical multiphoton absorption processes;

Similar reference characters are applied to similar elements throughout all the drawings.

FIG. 1 shows, in block diagram, a first embodiment of the invention comprising a radiation source 1, output utilization means 2, and a slab of a multiphoton absorbing material 3, in accordance with the present invention, disposed therebetween. In a typical embodiment, source 1 comprises an optical maser having an output power intensity which is subject to variation and a frequency $f$. Utilization means 2 is adapted to operate at said frequency $f$, but at a given power level less than the maximum that the source is apt to provide. Accordingly, limiter 3 comprises an appropriate multiphoton absorbing material which limits the radiation transmitted therethrough to said given level. Advantageously, limiter 3 is in the form of a slab having opposed major surfaces which are parallel planes polished to reduce reflections.

The simplest form of a suitable multiphoton absorbing material for limiting radiation at a frequency $f$ is a material characterized in that the difference between one unpopulated quantum energy level of the material and its steady-state level is given by $nhf$, where $n$ is a positive integer greater than 1, and $h$ is Planck's constant, and in that the parities of the two energy levels are the same for even values of $n$ and opposite for odd values. Advantageously, there are nearby levels which can combine strongly with the initial and final levels, as the presence of such levels increases the probability of multiphoton absorption. Silicon, for example, is characteristic of the simple form of a three-photon absorbing material for 1.06 micron radiation.

Figure 3:
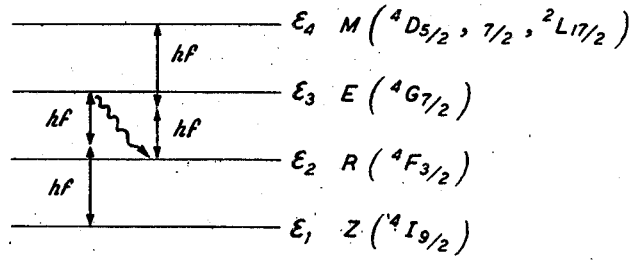
FIG. 3 is a detailed energy level diagram of multiphoton absorption of 1.06 micron radiation in $NdCl_3$.

FIG. 2 is an energy level diagram representing simple multiphoton absorption processes, and illustrates the relation between the energy levels of the material and the frequency of the radiation absorbed for the two, three and four-photon processes. For example, in a two-photon process, two photons of energy $hf_2$ at frequency $f_2$ are absorbed to make the transition between energy levels $E_1$ and $E_2$. In the three-photon process, three photons $hf_3$ at frequency $f_3$ are absorbed. In general, in a simple $n$-photon process $nhf_n$ photons at frequency $f_n$ are absorbed in a single transition. Additionally, there are multiphoton absorbing materials in which the process is more complicated. $NdCl_3$, $Nd^{3+}:LaCl_3$, $NdBr_3$, $Nd^{3+}:LaBr_3$, $NdI_3$ and $Np^{3+}:LaCl_3$ are examples of the more complex forms found useful for 1.06 micron radiation. In the neodymium compounds, for example, a sequence of two two-photon absorptions, separated by a non-radiative transfer occurs in the transition from the steady-state level to the final upper level. This is illustrated in FIG. 3, which shows a first two-photon absorption between energy levels $E_1$ and $E_3$, followed by a non-radiative transition from level $E_3$ to a lower level $E_2$, and a second two-photon absorption between energy levels $E_2$ and $E_4$. In effect, this is a four-photon process. However, it has been found that transitions of this type occur at substantially lower intensities than that required to produce simple transitions of the same order between energy levels $E_1$ and $E_4$ in the absence of intermediate energy levels. Other materials having sets of properly related energy levels separated by an allowed radiative or non-radiative transfer can be expected to behave in the same manner.

When the invention is in operation, radiation from source 1 of intensity I impinges upon limiter 3 which undergoes a multiphoton absorption transition. A portion of the incident power, having an intensity $I_T$, passes through the material and reaches utilizing means 2.

The relation between the transmitted intensity, $I_T$, and the incident intensity, I, is such that the radiation transmitted, $I_T$, in an $n$-photon process is given by, $$I_T = \frac{I}{(1+A_n I^{n-1})^{\frac{1}{n-1}}} \quad (2)$$

where $A_n$ is a constant which depends upon the constituency of the material and upon the energy levels and the number of photons involved in the transition. It may be seen from FIG. 4, in which the above relation is plotted for $n=2$, 3, 4, and, asymptotically, for $n$ approaching infinity, that the higher the order of the process, i.e., the greater the value $n$, the more nearly the material behaves as an ideal limiter. The higher order curves are characterized by a first region having a slope of approximately unity (where the transmitted intensity is nearly equal to the incident intensity), followed by a knee portion of decreasing slope, and a second region having a very small positive slope. The higher the value of $n$, the more nearly the slope in the first region is unity, the sharper the knee, and the more nearly the slope in the second region is zero.

The effect of varying the thickness of the absorbing material is not completely known. It is believed that the thicker the absorber, the sharper the knee of the transmission curve. It is not clear whether or not variation in the thickness affects the level of the saturation intensity.

In the experiments using a 1.06 micron continuous wave Nd:YAG optical maser, a source useful for optical communications systems, it was found that a polished slab of silicon one millimeter thick provides the limiting characteristics of a three-photon process and has an effective saturation intensity of about $5 \times 10^7$ watts per square centimeter, and that a slab of $NdCl_3$ provides four-photon limiting characteristics with a saturation intensity of $5 \times 10^5$ watts per square centimeter However, since the observed saturation intensity of $NdCl_3$ is about four orders of magnitude lower than that calculable for the simultaneous absorption of four photons, the characteristics are attributed to two double photon processes as shown in FIG. 3.

It should be noted that for very high intensities an $NdCl_3$ limiter will cease limiting. However, it operates over a significant range of about 10 decibels.

Because a multiphoton absorbing material absorbs the transmitted intensity, i.e., the power per unit area of the beam cross section, rather than the total power of the beam, it may be desired to provide a means for controlling the beam intensity in order to control the maximum amount of total power that is transmitted.

Figure 5:
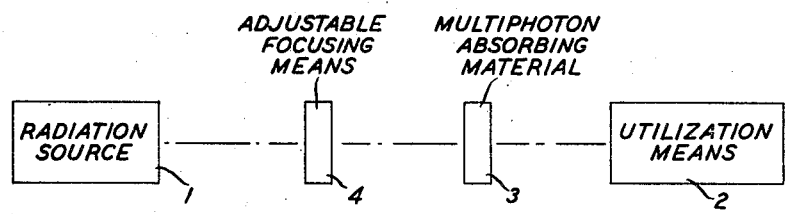
FIG. 5 is a block diagram of a typical power limiter in accordance with the invention.

In FIG. 5, which is a block diagram showing a limiter in accordance with this second aspect of the invention, there is shown a power limiter in which the beam intensity may be controlled by control over the area of the beam cross section as it passes through the limiter. It differs from the device shown in FIG. 1 in that a focusing means 4, preferably an adjustable one, such as a movable lens, is used to control the cross section of radiation impinging upon the multiphoton absorbing material 3. A sharply focused beam has a high intensity, and little total power is transmitted. On the other hand, an unfocused beam having the same power has a lower intensity and is therefore transmitted with little attenuation.

Figure 6:
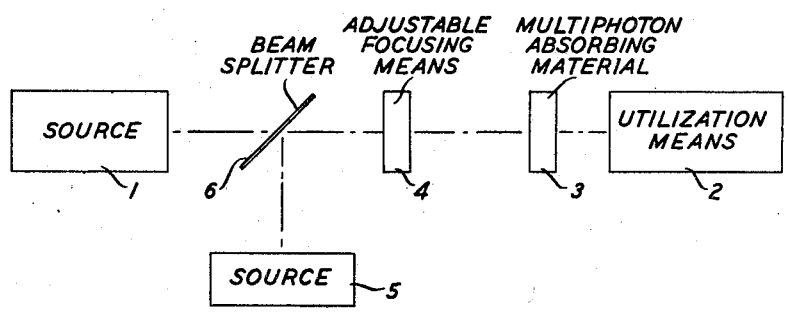
FIG. 6 is a block diagram of a limiter, in accordance with the present invention, adapted for use in limiting low intensity signals.

If the intensity of the beam to be limited is too low to reach the saturation intensity of the absorbing material 3, a second biasing beam of high intensity is advantageously used to obtain limiting. FIG. 6 shows, in block diagram, a limiter in accordance with the invention which is adapted for use in limiting low intensity signals. In this embodiment radiation from a second source 5 of the same frequency which is preferably a source having constant intensity such as a continuous wave laser, is added to that of the first source 1 which typically is a pulsed or modulated variable intensity source, by means such as a beam splitter 6. The combined beam is then focused to the desired area by the focusing means 4 and limited by the absorbing material 3. By properly selecting the intensity of the second beam, the low intensity signals are limited at the desired level. Advantageously, the utilization means 2 is a detector sensitive to fluctuations in the intensity of the combined beam.

In addition to providing for the construction of limiter devices, the present invention allows the construction of an anti-limiter.

An ideal anti-limiter is a device through which the power transmitted is zero for incident power less than some threshold level and proportional to the excess of incident power above the threshold level for higher values of incident power.

When two coherent beams having equal intensities and a 180 degree phase difference are made to interfere, they cancel one another by destructive interference. However, if one of the two beams is limited, they will not be completely canceled for intensities above the saturation level of the limiter.

Figure 7:
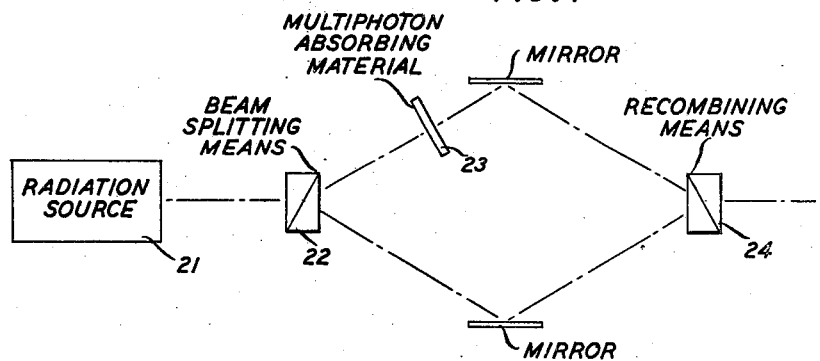
FIG. 7 is a block diagram of a typical antilimiter in accordance with the invention.

Accordingly an anti-limiter can be realized by dividing the incident radiation into two equal beams, limiting one of them, and then recombining the two beams 180 degrees out of phase. One embodiment for doing this is illustrated in FIG. 7, and includes a source of coherent radiation 21, a beam splitter 22, such as, for example, a Wollaston prism, a limiter 23 in one of the beam paths, and a means 24 for recombining the two beams along a common direction such as a second Wollaston prism.

Mirrors, or other waveguiding means, are included for guiding the beams between the input and output prisms. In particular, the lengths of the two wavepaths are made unequal by an amount such that the two beams recombine 180 degrees out of phase.

In operation the radiation transmitted from the recombining means 24 is substantially zero for values of source intensity less than twice the saturation intensity of the limiter 23 and proportional to the source intensity for higher values.

It is understood that the above-described arrangements are simply illustrative of a small number of the many possible specific embodiments which can represent applications of the principles of the invention. For example, while the invention is referred to as an optical limiter, its operation is not limited to that region. So long as the proper relation between the energy levels of the material and the frequency of the radiation source is maintained, a limiter can be constructed for the microwave or other regions of the electromagnetic spectrum. Thus, numerous and varied other arrangements can readily be devised in accordance with these principles by those skilled in the art without departing from the spirit and scope of the invention.

What is claimed is:

1. In combination, means for limiting the intensity of a beam of 1.06 micron wavelength electromagnetic radiation comprising an element of multiphoton absorbing material selected from the group consisting of $NdCl_3$, $Nd^{3+}$: $LaCl_3$, $NdBr_3$, $Nd^{3+}$: $LaBr_3$, $NdI_3$, $Np^{3+}$: $LaCl_3$ and Si; an optical source for directing onto said element of material a beam of 1.06 micron radiation, said radiation having an intensity subject to variation beyond the saturation intensity of said element of material; and means for utilizing 1.06 micron radiation after it has passed through said element.

2. The combination as in claim 1 wherein said source of radiation comprises a plurality of radiation sources comprising a variable intensity source and one or more constant intensity sources the sum of whose intensities when combined exceeds the saturation intensity of said material.

3. The combination as in claim 1 including variable focusing means disposed between said source of radiation and said limiting means.

4. An anti-limiting device for preventing the transfer of incident power less than a given level while transmitting power proportional to the excess incident power above the given level comprising, in combination:

an input source of coherent radiation of a given frequency;

means for dividing the radiation from said input source into two beams of equal intensity;

means for limiting the intensity of one of said equal intensity beams;

means for recombining said two beams along a common direction; and means for guiding said two beams from said dividing means to said recombining means along wavepaths which differ by a 180 degree phase shift.

References Cited

UNITED STATES PATENTS

| 3,233,108 | 2/1966 | Rosenblum | 250—199 |
| 3,270,291 | 8/1966 | Kosonocky | 331—94.5 |
| 3,397,316 | 8/1968 | Brown et al. | 250—213 |

OTHER REFERENCES

Singh et al., Three-Photon Absorbtion in Napthalene Crystals by Laser Excitation, Phys. Rev. Lttrs., vol. 12, #22, June 1, 1964, pp. 612–614.

Axe, Two-Photon Processers in Complex Atoms, Physical Rev. vol. 136, #1A, Oct. 5, 1964, pp. A42–A45.

"Optical Double-Photon Absorption in Cesium Vapor," by I. D. Abella, Physical Review Letters, vol. 9, No. 11, pp. 453–455.

RONALD L. WIBERT, Primary Examiner

PAUL K. GODWIN, Jr., Assistant Examiner

U.S. Cl. X.R.

252—301.4